(12) United States Patent
Hussain

(10) Patent No.: US 6,868,740 B2
(45) Date of Patent: Mar. 22, 2005

(54) MASS FLOW RATE MEASURING DEVICE AND PROCESS FOR MEASURING THE PRESSURE WITH A MASS FLOW RATE MEASURING DEVICE

(75) Inventor: Yousif A. Hussain, Weston Fevell (GB)

(73) Assignee: Krohne A.G., Basel (CH)

( * ) Notice: Subject to any disclaimer, the term of this patent is extended or adjusted under 35 U.S.C. 154(b) by 0 days.

(21) Appl. No.: 10/691,203

(22) Filed: Oct. 22, 2003

(65) Prior Publication Data

US 2004/0261541 A1 Dec. 30, 2004

(51) Int. Cl.[7] .............................................. G01F 1/84
(52) U.S. Cl. .............................................. 73/861.356
(58) Field of Search .................. 73/861.356, 861.355, 73/861.357

(56) References Cited

U.S. PATENT DOCUMENTS

| 6,164,140 | A | 12/2000 | Kalinoski |
| 6,732,570 | B2 * | 5/2004 | Francisco, Jr. ............. 73/32 A |
| 6,763,730 | B1 * | 7/2004 | Wray .................... 73/861.356 |

FOREIGN PATENT DOCUMENTS

| EP | 0 758 443 B1 | 11/1998 |
| EP | 0 895 581 B1 | 12/2001 |
| EP | 0 927 338 B1 | 11/2002 |

* cited by examiner

*Primary Examiner*—Harshad Patel
(74) *Attorney, Agent, or Firm*—Cesari and McKenna, LLP

(57) ABSTRACT

A mass flow rate measuring process measures the pressure on a mass flow rate measuring device. The mass flow rate measuring device works on the Coriolis principle and has a measuring line whereby a tension sensor is provided and the tension sensor is attached to the measuring line in such a way that the mechanical tension of the measuring line can be recorded with the tension sensor. A pressure signal output facility is also provided, the tension sensor is connected with the pressure signal output facility for transmitting a tension signal thereto and a pressure signal ascertained on the basis of the tension signal is outputtable by the pressure signal output facility. In this way, a Coriolis mass flow rate measuring device is provided, with which an additional parameter, i.e. the pressure of the medium flowing through the measuring line, can be recorded.

13 Claims, 2 Drawing Sheets

MASS FLOW RATE MEASURING DEVICE AND PROCESS FOR MEASURING THE PRESSURE WITH A MASS FLOW RATE MEASURING DEVICE

BACKGROUND OF THE INVENTION

1. Field of the Invention

The invention relates to a mass flow rate measuring device which works according to the Coriolis principle and has a measuring line, whereby a tension sensor is provided and the tension sensor is attached to the measuring line in such a way that the mechanical tension of the measuring line can be recorded with the tension sensor. The invention further relates to a process for measuring the pressure with a mass flow rate measuring device which works according to the Coriolis principle and has a measuring line.

2. Description of the Prior Art

A Coriolis mass flow rate measuring device of the kind mentioned in the beginning is known, for example, from the DE 42 24 379 C1. With this Coriolis mass flow rate measuring device it is proposed to provide a length variation sensor recording changes in the vibration length of the measuring line for correcting the measured value of the mass flow rate as a function of the vibration length and the tension. If in addition, a temperature sensor recording the temperature of the measuring line is provided for correcting the measured value, it is possible, to correct the measured value using temperature variations in the measuring line on the one hand, and on the other, length variations in the measuring line, i.e. of the vibration length of the measuring line, which influence the measured value. Thus it is possible to reduce or eliminate measuring errors due to temperature variations in the measuring line, in particular those which result from external forces.

Due to the fact that with this Coriolis mass flow rate measuring device known in the art, a length variation sensor recording variations in the vibration length of the measuring line is provided, it is possible to take into account a change in the vibration length influencing the vibration frequency of the measuring line and the axial state of tension of the measuring line, which allows measuring errors to be reduced or eliminated. If a temperature sensor is additionally provided it is possible to reduce or eliminate those measuring errors which are, on the one hand, due to temperature variations in the measuring line, and on the other hand, due to forces which act upon the measuring line from outside. The length variation signals given out by the length variation sensor are thus a direct measure for variations in the vibration length of the measuring line, independent of their origin, and an indirect measure for variations in the axial state of tension of the measuring line, also independent of their origin. The length variation sensor for recording the variations in the vibration length of the measuring line therefore makes it possible to record variations in the vibration length of the measuring line and variations in the axial state of tension of the measuring line and to reduce or eliminate resulting measuring errors when determining the measured value.

The previously described Coriolis mass flow rate measuring device known in the art with a tension sensor for recording the mechanical tension in the measuring line thus offers the possibility to output corrected measured values for the mass flow rate. An output of additional values which have nothing to do with the rate of flow through the measuring line of the Coriolis mass flow rate measuring device is, however, not envisaged. Therefore, if the recording and output of further parameters such as the pressure of the medium flowing through the measuring line of the Coriolis mass flow rate measuring device is of interest, a suitable additional sensor must be provided.

SUMMARY OF THE INVENTION

Starting from the above premises, it is the requirement of the invention to specify a Coriolis mass flow rate measuring device or a process of this kind respectively, with which it is possible to additionally record and output a further parameter, i.e. to record the pressure of the medium flowing through the measuring line of the Coriolis mass flow rate measuring device.

On the basis of the mass flow rate measuring device described in the beginning, the previously derived and indicated requirement is met in that a pressure signal output facility is provided, the tension sensor for transmitting a tension signal is connected with the pressure signal output facility, and a pressure signal ascertained on the basis of the tension signal is outputtable by the pressure signal output facility.

According to the invention use is thus made of the fact that a change in pressure of the medium flowing through the measuring line, in principle leads to a change in circumference of the measuring line. The amount of change in circumference of the measuring line, i.e. the amount of change in circumferential tension, is dependent upon the circumferential elasticity of the measuring line. A very thick-walled measuring line with an altogether small diameter will, for a change in pressure of the medium flowing through the measuring line, show a hardly recordable change in circumference, while very thin-walled measuring lines with an altogether very large diameter will show a distinct change in circumferential tension and thus in the circumference itself.

If, as mentioned herein, the tension sensor for transmitting a tension signal is connected with the pressure signal output facility and a pressure signal ascertained on the basis of the tension signal is outputtable by the pressure signal output facility, then it is clear that a pressure signal must first be ascertained from the tension signal recorded by the tension sensor. This pressure signal can be ascertained from the tension signal in various ways: firstly, for example, on the basis of a theoretically ascertained correlation between the pressure of the medium flowing through the measuring line on the one hand, and on the other hand, from the change in circumference of the measuring line for a concretely specified geometry of the measuring line, and secondly through empirically ascertained data. To ascertain such data, a medium of known pressure is, for example, flowed through the measuring line, and the tension is measured for this known pressure. This will yield a series of data with concrete value pairs of pressure, on the one hand, and concrete value pairs of tension, on the other. These value pairs may be used to create a table from which a corresponding pressure may be read during operation of the Coriolis mass flow rate measuring device depending upon the recorded tension. Intermediate values can be ascertained by interpolation. Thus it is possible to create an empirical calibration curve showing the dependency of the pressure of the medium flowing through the measuring line upon the recorded tension.

The conversion as such of the tension signal into a pressure signal must not necessarily take place in the pressure signal output facility. It can also take place in another facility of the Coriolis mass flow rate measuring device, so that the pressure signal output facility is then indirectly connected with the tension sensor, i.e. at least by means of this additional facility for determining the pressure signal as a function of the recorded tension signal.

It has already been mentioned that the principle underlying the invention can be particularly well utilized if a thin-walled measuring line with an altogether large diameter is provided. Accordingly, according to a further preferred development of the invention, a thin-walled measuring line is provided the diameter of which is of the magnitude of its length. In particular, it is envisaged that the ratio of the length of the measuring line to its diameter is smaller than or equal to 6 and preferably smaller than or equal to 4. However, in this context it should be noted that the principle according to the invention can, in principle, also be utilized for those Coriolis mass flow rate measuring devices where the length is larger relative to its diameter. Finally it should be pointed out that particularly good results can be achieved for those Coriolis mass flow rate measuring devices, which have a measuring line with a wall thickness between 0.5 mm and 0.25 mm. Insofar the principle according to the invention can also be applied to Coriolis mass flow rate measuring devices such as described in the WO 01/92833, the content of which is incorporated herein by reference.

The tension sensor used can, in principle, be any tensor sensor known in the art. In particular, it is advantageous if the tension sensor, due to its mass, has only a small, preferably a negligible influence upon the vibration characteristic of the measuring line. According to a preferred further embodiment of the invention, it is proposed to use a length variation sensor as tension sensor, in particular a strain gauge, which is able to record changes in circumference of the measuring line. In order to be able to record changes in circumference of the measuring line, it is necessary that the tension sensor is not oriented exclusively in longitudinal direction of the measuring line. It must, at any rate, also have some orientation in circumferential direction of the measuring line, which means that the tension sensor must be oriented at an angle to the longitudinal direction of the measuring line.

As regards the function according to the invention of the tension sensor, it is sufficient for this to be oriented, at least partially, in circumferential direction of the measuring line so that changes in circumference of the measuring line can be recorded. According to a preferred further embodiment of the invention it is, however, proposed that the tension sensor be oriented exactly in the circumferential direction of the measuring line so that the tension sensor is exclusively influenced by changes in circumferential tension, and not by tension variations which are different from changes in circumferential tension. If according to a preferred further development of the invention, an auxiliary tension sensor is provided in addition to the tension sensor for the circumferential tension, which auxiliary sensor cannot be influenced by the circumferential tension, different kinds of tension variations can be recorded separately from each other. In particular, according to a preferred further embodiment of the invention, provision may be made for the auxiliary tension sensor to be connected with the pressure signal output facility for transmitting an auxiliary tension signal, and for a pressure signal corrected on the basis of the auxiliary tension signal to be output by the pressure signal output facility. Thus, it is possible to correct other tension variations which are not due to changes in pressure of the medium. In particular, tension variations caused by temperature variations may be considered as such other tension variations.

Finally, according to a preferred further embodiment of the invention, a mass flow rate output facility connected with the pressure signal output facility may be provided on the Coriolis mass flow rate measuring device according to the invention, whereby a mass flow rate signal corrected on the basis of the pressure signal is outputtable by the mass flow rate output facility. This arrangement makes it possible to correct the mass flow rate signal output by the Coriolis mass flow rate measuring device as regards the pressure of the medium flowing through the measuring line, without separately measuring the pressure, typically just in front of or behind the measuring line of the Coriolis mass flow rate measuring device, with a separate pressure sensor.

On the basis of the process mentioned in the beginning for measuring the pressure with a mass flow rate measuring device which works according to the Coriolis principle, the requirement stated and described above is met in that the mechanical tension of the measuring line is recorded and in that on the basis of the recorded tension in the measuring line, the pressure in the measuring line is measured.

Preferred further developments of the process according to the invention can be derived by analogy to the above-mentioned preferred further embodiments of the mass flow rate measuring device according to the invention. The process according to the invention is suitable, in particular, for use with mass flow rate measuring devices which are provided with a thin-walled measuring line the diameter of which is of the magnitude of its length. As already stated earlier, such Coriolis mass flow rate measuring devices which are particularly suitable for use with the process according to the invention, are for example described in the WO 01/92833.

In detail, a multitude of possibilities exist for designing and further developing the mass flow rate measuring device according to the invention and the process according to the invention for measuring the pressure with a mass flow rate measuring device. In this respect reference is made to the patent subclaims following the independent patent claims and to the following detailed description of preferred embodiments of the invention with reference to the drawing.

DESCRIPTION OF THE PREFERED EMBODIMENTS

Figure 1:
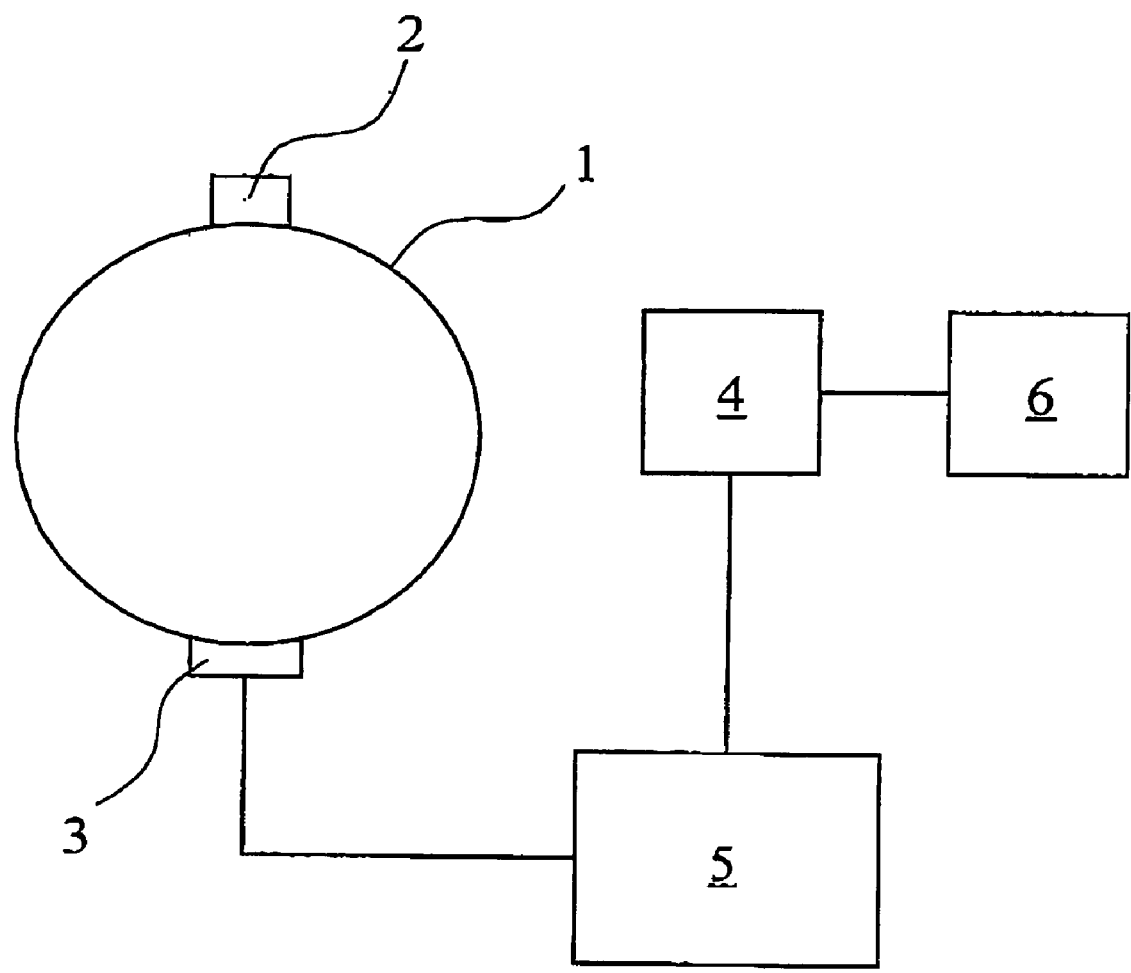
FIG. 1 is a schematically drawn sectional view of a Coriolis mass flow rate measuring device according to a first preferred embodiment of the invention.

FIG. 1 shows a schematically drawn sectional view of a Coriolis mass flow rate measuring device according to a first preferred embodiment of the invention. The Coriolis mass flow rate measuring device has a measuring line 1 to which a vibration generator 2 is attached. The Coriolis mass flow rate measuring device according to the first preferred embodiment of the invention is shaped as a so-called "thin shell" device which means that, firstly, the measuring line 1 has a relatively thin wall, in this case a wall thickness of merely 0.25 mm, and that, secondly, the ratio of the length of the measuring line 1 to its diameter is small, in this case below 4. In actual fact, the measuring line 1 of the Coriolis mass flow rate measuring device according to a first preferred embodiment of the invention may have a length of approximately 90 mm and a diameter of approx. 25 mm.

As shown in FIG. 1, a tension sensor 3 is attached to the measuring line 1, i.e. in the form of a strain gauge. Strain gauges used as sensors for measuring mechanical sizes, such as small elongations, compressions, bends and torsions and their associated elastic tensions are well known from the state of the art. The effective measuring element of such a strain gauge consists, for example, of a thin resistance wire which is applied in the shape of loops or zigzags to an expandable carrier strip made of plastic for example. When the strain gauge is attached to a deformable body such as the measuring line 1 of the Coriolis mass flow rate measuring device according to the first preferred embodiment of the invention, it also experiences the elongations or compressions occurring in the measuring spot when this is subjected to a load, which leads to lengthening and transverse contraction or to shortening and transverse compression of the resistance wire and thus to a change in its resistivity. This change in resistivity is proportional to the elongation and thus proportional to the elastic tension according to Hooke's law.

In order to be able to record the circumferential tension of measuring line 1, i.e. its elongation or contraction in circumferential direction, it is necessary for the strain gauge to be arranged at an angle to the longitudinal axis of measuring line 1. According to the first preferred embodiment of the invention shown in FIG. 1 the tension sensor 3 in the form of the strain gauge is attached to measuring line 1 exactly in circumferential direction. Thus this tension sensor 3 records tension variations arising exclusively from a circumferential change of measuring line 1, and no other tension variations, in particular not in the longitudinal direction of measuring line 1.

As shown in FIG. 1, a pressure signal output facility 4 is provided on the Coriolis mass flow rate measuring device according to the first preferred embodiment of the invention, which is connected with the tension sensor 3 via a calculating device 5. A tension signal ascertained by the tension sensor 3 is sent to the calculating device 5 which may be in the form of a microprocessor, where a pressure signal is calculated from the tension signal on the basis of empirically ascertained values, i.e. on the basis of an empirical function regarding the dependency of the tension recorded by the tension sensor 3 upon the pressure of the medium flowing through measuring line 1. This pressure signal is then forwarded to the pressure signal output facility 4 for output. The pressure signal output facility 4 may be in the form of an optical indicator, but may also be in the form of a bus interface so that further processing of the pressure signal may take place elsewhere. Finally, provision may be made for the pressure signal output facility 4 as illustrated herein, according the first preferred embodiment of the invention, to be connected with the mass flow rate output facility 6 of the Coriolis mass flow rate measuring device, so that a correction of the mass flow rate signal may be effected by the pressure signal and a mass flow rate signal may be output which has been corrected on the basis of the pressure signal.

Figure 2:
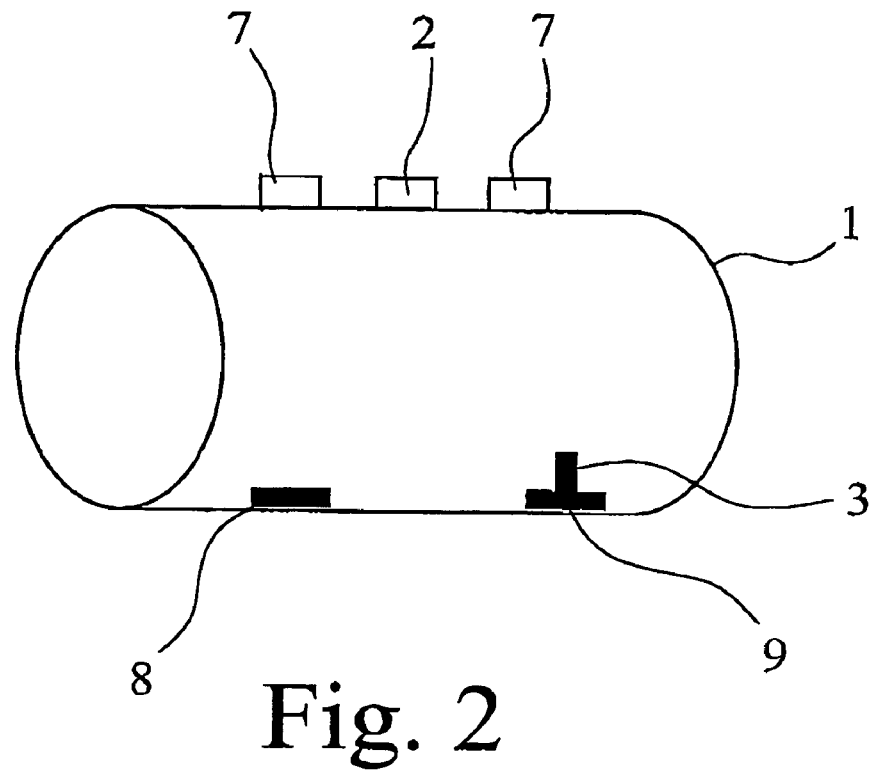
FIG. 2 is a schematically drawn side view of a Coriolis mass flow rate measuring device according to a second preferred embodiment of the invention.

FIG. 2 shows a schematically drawn side view of a Coriolis mass flow rate measuring device according to a second preferred embodiment of the invention. With the Coriolis mass flow rate measuring device according to the second preferred embodiment of the invention, vibration pickups 7 are provided, arranged, respectively, next to and at a distance from the vibration generator 2. These vibration pickups 7 record the vibration signal of measuring line 1, which is influenced by the Coriolis effect, whereby, as generally known for Coriolis mass flow rate measuring devices, the mass flow rate through the measuring line 1 is calculated from the phase difference between the vibration signals coming from one or the other of the vibration pickups 7. The vibration pickups 7 are thus, even if not shown in further detail in FIG. 2, connected with the mass flow rate output facility 6 for outputting a mass flow rate value.

As can also be seen from FIG. 2, a temperature sensor 8 is provided on the Coriolis mass flow rate measuring device according to the second preferred embodiment of the invention. Since, as explained at the beginning in connection with the generic Coriolis mass flow rate measuring device, tension variations occur in the measuring line 1 which, in particular, are also due to temperature variations. The change in tension of the measuring line 1 due to temperature changes may be ascertained by determining the temperature of measuring line 1 by means of the temperature sensor 8. Thus, a recorded tension signal may be corrected which results in a tension signal being obtained, which is based solely on a change in tension arising from pressure variations in the medium flowing through the measuring line 1.

Figure 3:
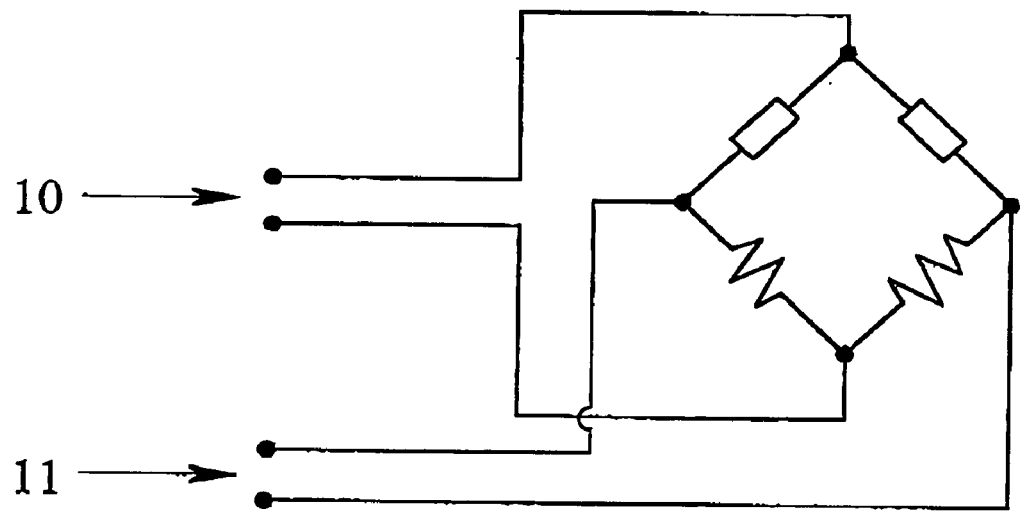
FIG. 3 is a circuit provided for the Coriolis mass flow rate measuring device according to the second preferred embodiment of the invention.

Additionally, as shown in FIG. 2, provision is made for an arrangement of a tension sensor 3 together with an auxiliary tension sensor 9 on a Coriolis mass flow rate measuring device according to the second preferred embodiment of the invention. With this arrangement, the tension sensor 3 is oriented totally in circumferential direction of measuring line 1, whereas the orientation of the auxiliary tension sensor 9 extends perpendicularly thereto, i.e. in longitudinal direction of measuring line 1. Due to this orientation of the auxiliary tension sensor 9 no circumferential tension variations are recorded by it so that the following procedure becomes possible: the tension sensor 3 and the auxiliary tension sensor 9 are arranged, each in the shape of a strain gauge, inside a Wheatstone bridge as shown in FIG. 3. Due to the fact that both the tension sensor 3 and the auxiliary tension sensor 9 are influenced by temperature variations, the temperature effect is eliminated when the Wheatstone bridge is equalized: The electrical tension signal output at output 10 of the Wheatstone bridge is independent of tension variations in the measuring line 1 which are due to temperature variations. As is well known, the input 11 of the Wheatstone bridge serves as a connection for a supply voltage.

With the Coriolis mass flow rate measuring device according to the second preferred embodiment of the invention, provision is made for both a temperature sensor 8 and a combination of tension sensor 3 and auxiliary tension sensor 9 for use within a Wheatstone bridge. To eliminate the temperature effect it is, of course, possible to provide only a tension sensor 3 without an auxiliary tension sensor 9 together with the temperature sensor 8. The temperature sensor 8 may, however, be omitted where the combination of tension sensor 3 and auxiliary tension sensor 9 exists, as described above.

What is claimed is:

1. A mass flow rate measuring device which works on the Coriolis principle comprises
   a measuring line;
   a tension sensor attached to the measuring line for sensing the mechanical tension in the measuring line and producing a corresponding tension signal, and a pressure signal output facility connected to receive the tension signal, said pressure signal output facility providing a pressure signal ascertained on the basis of said tension signal.

2. The mass flow rate measuring device according to claim 1, and further including a mass flow rate output facility connected with the pressure signal output facility, said mass flow rate output facility providing a mass flow rate signal corrected on the basis of said pressure signal.

3. The mass flow rate measuring device according to claim 1 or 2, wherein said measuring line is a thin-walled measuring line whose diameter and length are of substantially the same magnitude.

4. The mass flow rate measuring device according to claim 1 or 2, wherein said tension sensor is a length variation sensor, in particular a strain gauge, which is suitable for recording changes in the circumference of the measuring line.

5. The mass flow rate measuring device according to claim 1 or 2, wherein the tension sensor is oriented in the circumferential direction of the measuring line so that the tension sensor is influenced only by changes in the circumferential tension of the measuring line.

6. The mass flow rate measuring device according to claim 5, and further including an auxiliary tension sensor attached to the measuring line such that it is not influenced by said circumferential tension.

7. The mass flow rate measuring device according to claim 6, wherein the auxiliary tension sensor is connected with the pressure signal output facility and transmits an auxiliary tension signal thereto, said pressure signal output facility producing a pressure signal corrected on the basis of said auxiliary tension signal.

8. A process for measuring the pressure on a mass flow rate measuring device which works according to the Coriolis principle and has a measuring line, said process comprising the steps of recording the mechanical tension of the measuring line, and ascertaining the pressure in the measuring line on the basis of the recorded mechanical tension of the measuring line.

9. The process according to claim 8, including the step of providing a mass flow rate signal corrected on the basis of the ascertained pressure.

10. The process according to claim 8 or 9, wherein the tension is recorded by means of a change in circumference of the measuring line.

11. The process according to claim 10, wherein only the change in circumference of the measuring line is recorded as tension, and including the additional step of recording an auxiliary tension which is not influenced by the circumferential tension.

12. The process according to claim 11, including the step of correcting the pressure ascertained on the basis of the circumferential tension by means of the auxiliary tension.

13. The process according to claim 8 or 9, including the step of forming the measuring line as a thin-wall measuring line whose diameter and length are of substantially the same magnitude.

* * * * *